United States Patent [19]
Summerlin

[11] 3,861,014
[45] Jan. 21, 1975

[54] FASTENER PLACING APPARATUS
[75] Inventor: Frederick Arthur Summerlin, Wheathampstead, England
[73] Assignee: AERPAT A.G., Zug, Switzerland
[22] Filed: Jan. 7, 1974
[21] Appl. No.: 431,224

[30] Foreign Application Priority Data
Jan. 12, 1973 Great Britain...................... 1750/73
Feb. 20, 1973 Great Britain...................... 8238/73

[52] U.S. Cl............................................. 29/200 B
[51] Int. Cl............................................. B23p 19/00
[58] Field of Search............ 29/200 B, 200 P, 200 R

[56] References Cited
UNITED STATES PATENTS
3,574,915 4/1971 Jeal................................... 29/200 B Primary Examiner—Thomas H. Eager
Attorney, Agent, or Firm—Oblon, Fisher, Spivak, McClelland & Maier

[57] ABSTRACT

Fastener placing apparatus in which a lead-screw device arranged to be driven by a rotary power unit drives a threaded mandrel to reciprocate relative to an abutment member and also to rotate, has a first torque-limiting rotary connection between driving and driven elements of the lead-screw device and a second torque-limiting rotary connection between the driven element of the lead-screw device and a body housing the lead-screw device. At least one of the torque-limiting connections is arranged to sustain a higher torque in one direction of its rotation than in the other direction and the relationship between the two torque-limiting connections is such that the first torque-limiting connection sustains a higher torque than the second torque-limiting connection when the lead-screw device is driven in one rotary sense and a lower torque than the second torque-limiting connection when the lead-screw device is driven in an opposite rotary sense.

7 Claims, 6 Drawing Figures

FASTENER PLACING APPARATUS

The invention relates to fastener placing apparatus, more particularly for placing fasteners of the type comprising a threaded first part which is pulled towards and/or into a second part of the fastener to place the fastener. Such a fastener is hereinafter referred to as "a fastener of the type defined." The first and second parts of the fastener may be integral with each other, and may separate during the placing operation.

The fastener placing apparatus with which the present invention is concerned is generally of the type disclosed in British Pat. No. 1,272,771, U.S. Pat. No. 3,574,915 and German Pat. No. 1,939,482. Such fastener placing apparatus comprised a body member; a threaded member for engaging with the threaded first part of a fastener to be placed, and rotatable and reciprocable with respect to the body member; an abutment member for abutting the second part of the fastener, the said abutment member being displaceable with respect to the body member by the second part of the fastener when the said second part of the fastener and the body member are drawn together by rotation of the threaded member with respect to the said first part of the fastener when engaged therewith; means actuated by displacement of the abutment member towards the body member as aforesaid, to stop rotation of the threaded member and to retract the threaded member with respect to the body member, thereby to place the fastener; and a spring-loaded detent for positively retaining the abutment member in its position towards the body member in which it actuates the stopping of rotation of the threaded member.

However, it was found in practice that the last-mentioned feature, the spring-loaded detent for retaining the abutment member displaced, was subject to damage after continued heavy use of the apparatus. This damage resulted in faulty operation, or non-operation, of the detent, as a result of which the threaded member sometimes remained retracted inside the body member, from which it could be drawn out again to engage the next fastener to be placed.

One object of the present invention is to allow the spring detent of the prior art tool to be omitted.

Accordingly the invention provides apparatus for placing a fastener of the type comprising a threaded first part which is pulled towards and/or into a second part to place the fastener, which apparatus comprises:
a body member;
a threaded member for threadedly engaging with the threaded first part of a fastener to be placed, said threaded member being rotatable and reciprocable with respect to the body member;
a lead-screw device comprising a first element and a second element in threaded engagement with each other, the first element being arranged to be rotationally driven, and the second element being drivingly connected to the threaded member whereby the threaded member may be rotated and reciprocated by the second element;
an abutment member for abutting the second part of the fastener when the threaded member is engaged with the first part of the fastener, the abutment member being engageable by the second part of the fastener when the said second part and the body member are drawn towards each other by rotation of the threaded member in a sense appropriate to advance the threaded member into threaded engagement with the first part of the fastener;
rotation-stopping means, actuated by engagement of the abutment member with the second part of the fastener as aforesaid, to stop rotation of the second element of the leadscrew device whereby continued rotation of the first element in the said appropriate sense causes relative rotational and axial movement of the first and second elements of the lead-screw device and longitudinal movement of the threaded member relative to the body member and the abutment member in a first direction to draw the first and second parts of the fastener towards each other;
a first torque-limiting rotary connection between the first and second elements of the lead-screw device;
and a second torque-limiting rotary connection between the second element of the lead-screw device and the body member;
the relationship between the torque-limiting rotary connections being such that, when the first element of the lead-screw device is rotationally driven in the sense appropriate to engage the threaded member with the first part of the fastener, the torque limit sustained by the first connection is higher than that sustained by the second connection so that the threaded member rotates to engage the first part of the fastener until the actuation of the rotation-stopping means as aforesaid; and such that when the first element of the lead-screw device is rotationally driven in the opposite sense, the torque limit sustained by the first connection is lower than that sustained by the second connection so that the first element of the lead-screw device rotates with respect to the second element and causes longitudinal movement of the threaded member in a second direction opposite to the first direction.

In one embodiment of the invention, the said second torque-limiting rotary connection sustains substantially the same torque limit upon rotation of the first element of the lead-screw device in either sense, and the said first torque-limiting rotary connection sustains a higher torque limit than the said same torque limit upon rotation of the first element of the lead-screw device in said one sense and sustains a lower torque limit than said same torque limit upon rotation of the first element of the lead-screw device in said opposite sense.

In another embodiment of the invention, the said second torque limiting rotary connection sustains a lower torque limit upon rotation of the first part of the lead-screw device in the said appropriate sense and sustains a higher torque limit upon rotation of the second part of the lead-screw device in said opposite sense. In this case, the said second torque limiting device may comprise two interengaging sets of teeth having sloping faces, and means for urging the two sets of teeth resiliently towards each other, those faces which are urged into contact with each other upon rotation of the first element of the lead-screw device in the said appropriate sense being less steeply sloping than those teeth which are urged into contact with each other upon rotation of the first element of the lead-screw device in the said opposite sense.

The said first torque limiting rotary connection may comprise a first surface carried by the first element of the lead-screw device, a second surface carried by the second element of the lead-screw device, and means for urging the first and second surfaces into frictional contact with each other. The urging means may comprise a resilient spring and one of the first and second surfaces is provided by a surface of the spring. Alternatively, the first and second surfaces may be urged into frictional contact with each other as aforesaid by relative axial movement of the first and second elements of the lead-screw device in the direction reverse to the direction which draws the first and second parts of the fastener towards each other, in which case the means for urging the first and second surfaces into frictional engagement with each other comprises the first and second elements of the lead-screw device and the second torque limiting connection.

Some specific embodiments of the invention, in the form of a fastener placing tool adapted to be driven by a reversible motor, will now be described by way of example and with reference to the accompanying drawings in which.

Figure 1:
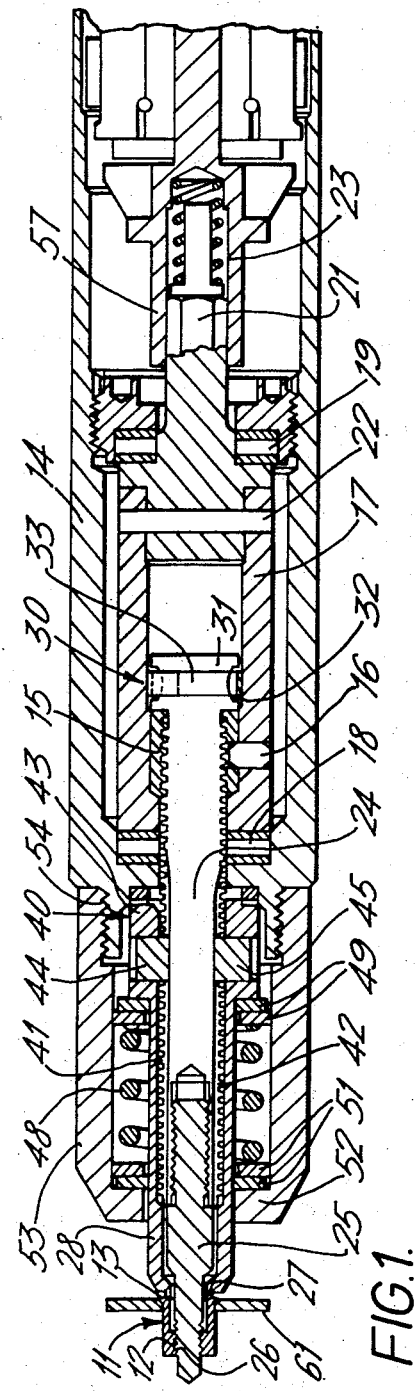
FIG. 1 is a longitudinal section through the placing tool and a fastener, before placing.

In these examples, the tool is used to place a fastener which is illustrated at 11 in FIG. 1. The fastener is generally tubular and includes an internally threaded first part 12 at one end which, when the fastener is placed, is pulled towards the second part of the fastener provided by the other end thereof which has a small outwardly extending radial flange or head 13. Fasteners of this type are well known in the mechanical assembly industry, for providing threaded sockets in relatively thin panels.

The placing tool of this example comprises a main, generally cylindrical, body member 14. the body contains a lead-screw device comprising a first element in the form of a nut 15 which is secured by means of a pin 16 inside a cylindrical nut tube 17. The nut tube 17 is rotatable within the body member on two thrust bearings 18, 19. Protruding from the rear of the nut tube is a hexagonal key 21 which is secured to the nut tube by means of a crosspin 22. The hexagonal key 21 engages inside a hexagonal socket 23 provided on the front end of the rotary pneumatic motor unit. The rear end of the placing tool body member 14 is internally threaded and is thereby secured to the body of the pneumatic motor unit.

The second element of the lead-screw device comprises an elongated drawbolt 24 which is externally threaded to engage with the nut 15, the thread form used being one which is able to stand considerable axial stress, e.g., a butress or 'acme' thread. To the front end of the drawbolt 24 is secured a fastener-engaging threaded member in the form of a mandrel 25 which near its remote extremity carries external threading 26 suitable to engage the threaded part 12 of the fastener to be placed.

An abutment member for abutting the head of the fastener is provided by the annular front end 27 of a tubular nose piece 28 which surrounds the forward part of the drawbolt 24 and the rear part of the threaded mandrel 25.

The nosepiece 28 is reciprocable with respect to the body member to a limited extent and is also keyed to the drawbolt for rotation therewith. The drawbolt carries two opposed longitudinal keyways, 41, 42, and the rear end of the nosepiece is enlarged to form a head 43 carrying two inwardly directed keys 44, 45 which engage in the keyways, 41, 42 respectively.

Between the drawbolt and the nut of the lead-screw device is provided a first torque-limiting rotary connection 30. Rearwardly of the nut the drawbolt is radially enlarged to form a head 31 (see also FIG. 3) having in its periphery an annular groove 32. Received within this annular groove is a generally circular band-spring 33 which is secured against rotation with respect to the drawbolt by means of one end portion 34 which is bent radially inwardly and received within a cross-bore 35 within the drawbolt head. The arcuate part of the spring 33 extends for rather less than 360°, and its unstressed diameter is larger than the internal diameter of the nut tube 17. Consequently the spring 33 presses against the interior of the nut tube in frictional engagement. It will be apparent that when the nut tube is rotated in a clockwise sense (as viewed from the rear of the tool i.e., the right hand end of FIGS. 1, 2 and 3) with respect to the drawbolt, the frictional force on the exterior of the spring 33 will tend to make it unwind and increase in diameter, thus tending to wedge it even more tightly against the interior of the nut tube and increasing the torque which can be transmitted from the nut tube to the drawbolt via the spring 33 in a clockwise sense. Conversely, when the nut tube is rotated in an anti-clockwise sense with respect to the drawbolt, the frictional force on the exterior of the spring 33 will tend to make it wind round the drawbolt head and decrease its diameter. Consequently the reaction force between the exterior of the spring 33 and the interior of the nut tube 17 will be less, so that a lower torque can be transmitted from the nut tube to the drawbolt via the spring 33 in an anti-clockwise sense than in a clockwise sense.

A second torque limiting rotary connection 40 is provided between the nosepiece and the body member, and thus, since the nosepiece is keyed to the drawbolt for rotation therewith, between the drawbolt and the body member. The connection 40 (see also FIG. 4) comprises a first set 46 of dogs or teeth with sloping faces on the rear face of the nose-piece head 43, a second complementary set 47 of dogs with similarly sloping faces on the front of the body member 14, and means for resiliently urging the two sets of dogs into engagement in the form of a helical compression spring 48, one end of which bears upon the forward annular face of the nosepiece head 43 via washers 49. The forward end of the spring 48 is held by washers 51 within the front end 52 of a tubular cap 53, of which the rear end 54 is screwed onto the exterior of the front of the body member 14.

The axial urging together of the two sets 46, 47 of sloping dogs by means of the spring 48 prevents relative rotation of the nosepiece and drawbolt with respect to the body member unless sufficient torque is applied to make the dogs 46 overcome the urging of spring 48 and climb up the inclined faces of dogs 47. It is arranged that the torque which can be transmitted in a clockwise direction from the nut tube 17 through the band-spring 33 to the drawbolt 24 is greater than the torque required to make the dogs 46, 47 slip in that direction; while the torque which can be transmitted from the nut tube through band-spring 33 to the drawbolt in an anti-clockwise direction is less than the torque required to make the dogs 46, 47 slip in that direction.

In the placing tool of this example, the dogs 46, 47 also provide means for stopping rotation of the drawbolt when the nosepiece 28 is displaced towards the body member by an additional force which reinforces that of the spring 48. This occurs, in use of the tool, when the screw thread 26 on the mandrel 25 advances in threaded engagement into the threaded part of a fastener due to rotation of the mandrel in the appropriate sense, causing the fastener to be drawn into contact with the front end 27 of the nosepiece and forcing the nosepiece rearwardly towards the body member, thus holding the dogs 46, 47 positively in engagement.

Figure 5:
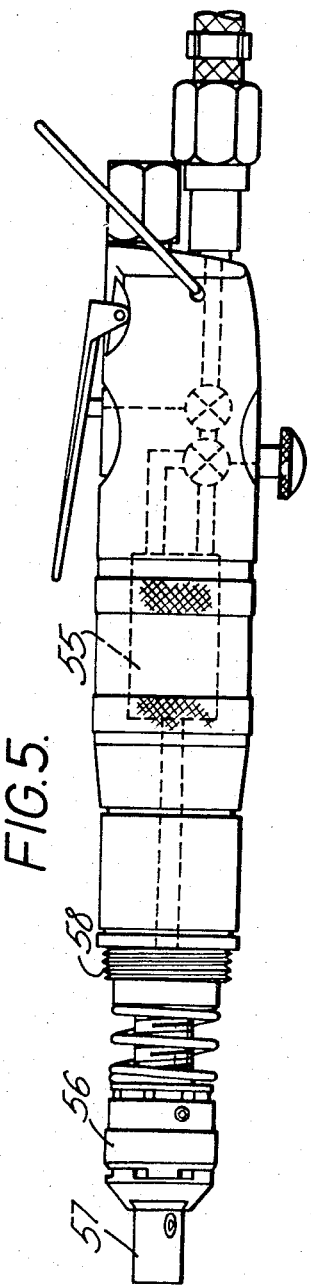
FIG. 5 shows a pneumatic reversible rotary motor unit for use in driving the placing tool.

The pneumatic motor unit shown in FIG. 5 is of a conventional type well known in the mechanical assembly industry for providing rotary drives to many different sorts of tools. It has a reversible air motor 55 and, to prevent the motor stalling under high load conditions, a bi-directional slipping clutch 56. Projecting from the front end of the clutch is a short shaft 57 carrying the hexagonal socket 23 which drives the nut tube 17 of the placing tool. External threading 58 on the front end of the exterior of the motor unit body is screwed into the complementary internal threading on the rear end of the placing tool body member. Since the placing tool of the present invention also employs rotary slipping clutches or torque limiting devices, the slipping clutch 56 of the pneumatic motor unit must be selected so as to sustain a higher torque than any of the torque limiting devices in the placing tool.

The operation of a placing tool will now be described.

Figure 2:
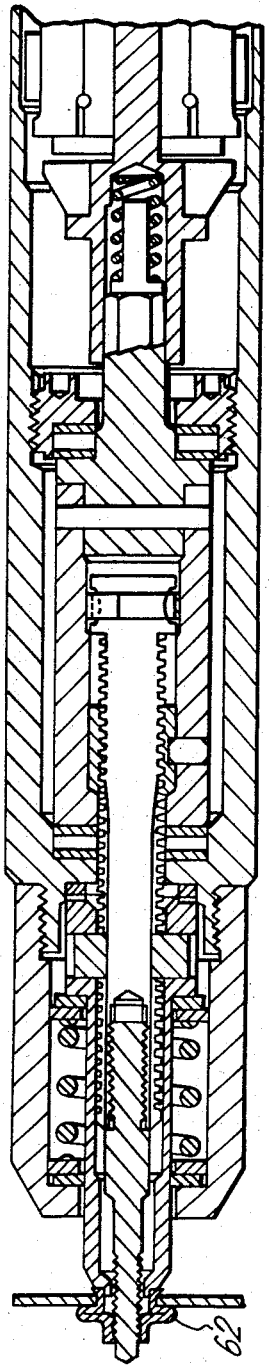
FIG. 2 is a similar section showing the position after placing.
Figure 3:
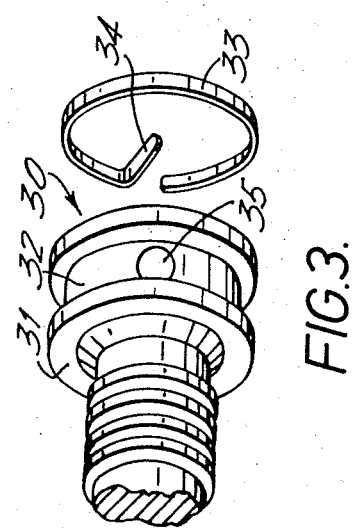

The tubular fastener 11 is first pushed in a suitable hole in a panel 61 in which it is to be placed. Initially the drawbolt 24 is in its forward most position, as illustrated in FIG. 1. The head of the drawbolt is screwed right up against the nut 15, and the torque which can be transmitted in a clockwise direction from the nut tube 17 to the drawbolt 24 is greater than that required to make the dogs 46, 47 slip. The operator switches on the pneumatic motor unit to drive in a clockwise sense (i.e., so as to screw the threaded mandrel 26 into the threaded part 12 of the fastener). Consequently the drawbolt, threaded mandrel and nosepiece rotate, with the nosepiece 28 reciprocating slightly in a longitudinal direction as the dogs slide over each other under the urging of spring 48. The rotating threaded end 26 of the mandrel is inserted into the fastener (aided by the tapered end of the mandrel beyond the threaded portion) and the threaded mandrel screws its way into the threaded portion of the fastener. This draws the whole of the placing tool towards the fastener, until the annular front 27 of the nosepiece contacts the head 13 of the fastener. As the mandrel is screwed further into the fastener, the fastener abuts and then pushes the nosepiece progressively towards the body of the placing tool, reinforcing the urging of spring 48. Since the threaded engagement of the fastener with the mandrel positively moves the nosepiece rearwardly, this positively prevents the nosepiece dogs 46 from climbing out of and disengaging from the body member dogs 47, thus preventing rotation of the nosepiece 28 and mandrel 25 and drawbolt 24 with respect to the body member. As this locking is quite positive, the clockwise torque which can be sustained by the band-spring 33 in frictional engagement with the nut tube 17 is exceeded, so that the rotary connection 30 then slips. The nut 15 then rotates in a clockwise sense with respect to the drawbolt 24, pulling the drawbolt 24 rearwardly with respect to the nut 15 and the body member 14, without the threaded mandrel 26 rotating. This exerts considerable axial compression upon the fastener between the threaded portion 12 at one end and the head 13 at the other end. The result is that the body of the fastener behind the panel 61 collapses longitudinally and expands radially outwardly to form an annular fold or crimp as shown at 62 in FIG. 2. As this folding continues, the tension in the drawbolt increases thereby increasing the torque required from the motor. This continues until the slipping clutch 56 of the motor unit cannot support the torque and consequently slips. The relative disposition of the various parts of the placing tool are then as shown in FIG. 2.

The operator then reverses the direction of rotation of the pneumatic motor unit, so that the drive to the placing tool is reversed to give an anti-clockwise drive. At this point the dogs 46, 47 are still positively locked in engagement by the force exerted on the outer end of the nosepiece by the head of the fastener screwed up on the threaded mandrel. Since the nut 15 is now rotating in an anti-clockwise direction, with the band-spring 33 slipping, the drawbolt 24 starts to move forwardly out of the tool body member without rotating. Thus the tool body and nosepiece are retracted from the fastener 11, and almost immediately the front end 27 of the nosepiece loses contact with the head of the fastener. However since the dogs 46, 47 are still being urged into engagement by the spring 48, and the torque transmitted through the band-spring 33 in the anti-clockwise direction is insufficient to disengage the dogs, the dogs 46, 47 remain engaged and the drawbolt 24 does not rotate with respect to the body member. Since the nut 15 is still rotating in an anti-clockwise sense, the drawbolt and the threaded mandrelk continue to be returned in a forward direction with respect to the body of the placing tool and the nosepiece, the mandrel still not rotating but remaining in threaded engagement with the placed fastener. This movement continues until the head 31 of the drawbolt contacts the rear of the nut 15. Since further rotation between the drawbolt and the nut is then positively prevented, sufficient torque in an anti-clockwise direction is then positively applied to the drawbolt to overcome the urging of the spring 48 and cause the dogs 46, 47 to ride over each other to allow the drawbolt and threaded mandrel to rotate in an anti-clockwise direction. This anti-clockwise rotation of the threaded mandrel unscrews the latter from the placed fastener. The placing tool is then in the condition shown in FIG. 1 (except that it is disengaged from the placed fastener) and is ready to start the next placing cycle.

Figure 4:
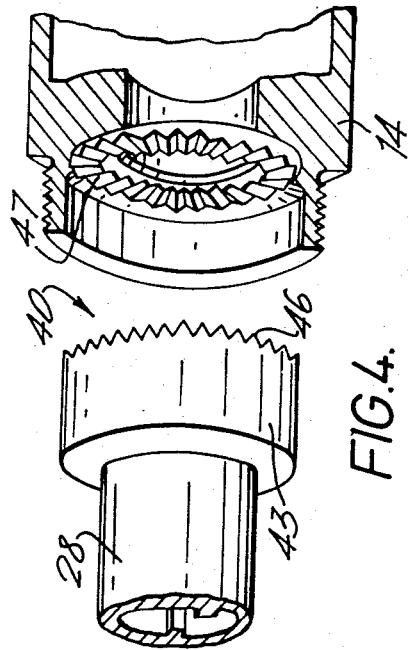
FIGS. 3 and 4 are exploded views of the first and second torque-limiting connections respectively.
Figure 6:
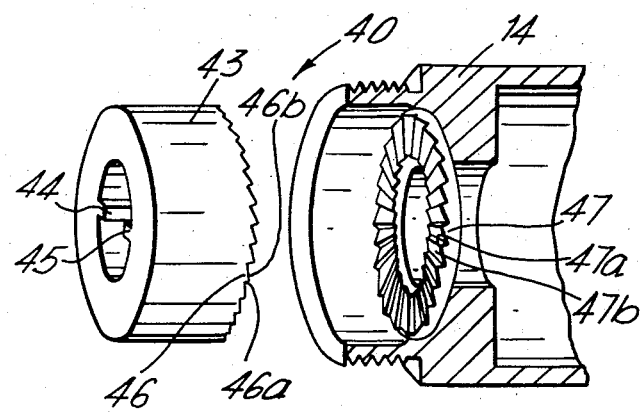
FIG. 6 corresponds to FIG. 4 but shows a second embodiment.

The second embodiment of the invention is substantially similar to that just described with reference to FIGS. 1 to 5, but the second torque-limiting device 40 is not as shown in FIG. 4 but is as shown in FIG. 6. In this embodiment, the set of dogs 47 on the body member 14 and the complementary set of dogs 46 on the nosepiece head 43 have those faces 47a and 46a respectively, which are urged rotationally into mutual contact when the nosepiece and drawbolt have anti-clockwise (as viewed from the right hand end of the Figure) torque applied to them, more steeply sloping than the faces 47b and 46b on the other side of each dog which are urged into mutual contact when the nosepiece and drawbolt have a clockwise torque applied to them. In this particular example, the faces 46a, 47a are inclined to a transverse plane at 60° slope, and the faces 46b 47b at 30° slope. Since the two sets of dogs are spring urged axially towards each other, the torque required to make the faces 46a climb up the faces 47a is greater than the torque required to make the faces 46b climb up the faces 47b. That is to say, the dogs 46, 47 slip at lower torque when the nosepiece and drawbolt are being urged clockwise than when they are being urged anti-clockwise. This difference in slip torque values of the dogs 46, 47 means that the difference in slip torque values in the clockwise and anti-clockwise senses in the other torque limiting rotary connection (the band-spring 33) may be less.

Although in the two embodiments described above, the band spring 33 is such that it will not transmit sufficient torque in an anti-clockwise direction to overcome the spring 48 and disengage the dogs 46, 47, tests which have been carried out suggest that such a placing tool will also operate satisfactorily if the torque transmitted in an anti-clockwise sense by the band spring 33 is marginally sufficient to cause some relative rotation of the dogs 46, 47 provided that there is substantial relative rotation between the nut 15 and the drawbolt 24 to return the drawbolt to its forward position. Relative rotation between the threaded part 26 of the mandrel and the threaded part 12 of the fastener with the mandrel rotating in an anti-clockwise sense i.e., unscrewing, is acceptable, since in this condition the threads on the mandrel 26 are not under stress. It is however highly undesirable that the mandrel 26 should rotate in a clockwise sense (i.e., screwing into the fastener) whilst those threads are under stress, since this results in a rapid deterioration of the threads on the mandrel. The placing tool described in the foregoing embodiments avoids this, since as soon as there is any appreciable axial stress on the threads when the mandrel is screwing in, which occurs only after the fastener head 13 exerts an appreciable thrust on the front end 27 of the nosepiece 28, the mandrel 26 stops rotating and the axial stress on the threads occurs while no relative rotation is present.

The third embodiment of the invention is also substantially similar to the second one just described, and illustrated in FIGS. 1, 2, 3, 5 and 6, except that the first torque-limiting rotary connection takes a different form. In this third embodiment, the band-spring 33 is omitted, and the first torque-limiting rotary connection is provided by the frictional contact between the annular surface on the head 31 of the drawbolt and the annular end surface of the nut 15. This frictional connection comes into effect only when necessary in the cycle of operation of the placing tool, namely from the end of the return stroke of the drawbolt until the beginning of its next pull stroke. During the return stroke, the nut 15 is rotating in an anti-clockwise sense and the drawbolt 24 is prevented from rotating by the torque sustained by the second torque-limiting device, i.e., the two sets of dogs 46, 47 urged together by the spring 48. When the head 31 of the drawbolt reaches the end of the nut 15, their two contacting surfaces are screwed together by virtue of the relative rotation of the drawbolt and the nut until the torque transmitted frictionally across those surfaces is equal to, or greater than, the torque required to make the dogs 46, 47 slip in the anti-clockwise sense. This torque is much higher than the torque which the dogs 46, 47 will sustain in the clockwise sense, and it is this lower torque which limits the torque which can be applied to the frictionally engaged surfaces of the drawbolt head and the nut when the nut is rotated in a clockwise sense, at the start of the next cycle of operation of the tool. In other words, the drawbolt-head and the nut can be frictionally engaged together by being "screwed up" at the end of the return stroke by a torque which is relatively high. For example, experiments have shown that, with a tool according to this embodiment, a torque of 15 pound-inches was needed to make the drawbolt-head and nut disengage from their frictional engagement. The torque, thus available, i.e., the torque sustained by the first torque-limiting connection, is sufficiently high to overcome any slight resistance offered by engagement of the threaded mandrel 26 into the next fastener, so that the drawbolt remains rotating with the nut at the start of the next placing cycle of the tool, until the rearward displacement of the nosepiece 28 locks up the dogs 46, 47 as in the previous embodiments. The frictional engagement of the drawbolt head and nut is then overcome and the drawbolt drawn back through the nut, also as in the previous embodiments.

One advantage of the placing tools of the foregoing embodiments is that they secure the automatic return of the drawbolt to its starting position when rotation of the motor is reversed, and in fact the drawbolt is returned to its initial position before unscrewing of the threaded mandrel from the placed fastener is started. This overcomes a practical disadvantage of the previously mentioned prior art type of placing tool in which the dogs 46, 47 were not provided with a biasing spring 48 but were held either in engagement or out of engagement by means of a spring detent. This made is possible for the nosepiece to be moved to and held in a position in which the dogs were not engaged but in which also the drawbolt was completely retracted and could not be brought forward again ready for the next placing cycle.

I claim:

1. Apparatus for placing a fastener of the type comprising a threaded first part which is pulled towards and/or into a second part to place the fastener, which apparatus comprises:

a body member;

a threaded member for threadedly engaging with the threaded first part of a fastener to be placed, said threaded member being rotatable and reciprocable with respect to the body member;

a lead-screw device comprising a first element and a second element in threaded engagement with each other, the first element being arranged to be rotationally driven, and the second element being drivingly connected to the threaded member whereby the threaded member may be rotated and reciprocated by the second element;

an abutment member for abutting the second part of the fastener when the threaded member is engaged with the first part of the fastener, the abutment member abutting the second part of the fastener when the said second part and the body member are drawn towards each other by rotation of the threaded member in a sense appropriate to advance the threaded member into threaded engagement with the first part of the fastener;

rotation-stopping means, actuated by engagement of the abutment member with the second part of the fastener as aforesaid, to stop rotation of the second element of the lead-screw device whereby continued rotation of the first element in the said appropriate sense causes relative rotational and axial movement of the first and second elements of the lead-screw device and longitudinal movement of the threaded member relative to the body member and the abutment member in a first direction to draw the first and second parts of the fastener towards each other;

a first torque-limiting rotary connection between the first and second elements of the lead-screw device; and a second torque-limiting rotary connection between the second element of the lead-screw device and the body member;

the relationship between the torque-limiting rotary connections being such that when the first element of the lead-screw device is rotationally driven in the appropriate sense to engage the threaded member with the first part of the fastener, the torque limit sustained by the first connection is higher than that sustained by the second connection so that the threaded member rotates to engage the first part of the fastener until the actuation of the rotation-stopping means as aforesaid; and such that when the first element of the lead-screw device is rotationally driven in the opposite sense, the torque limit sustained by the first connection is lower than that sustained by the second connection so that the first element of the lead-screw device rotates with respect to the second element and causes longitudinal movement of the threaded member in a second direction opposite to the first direction.

2. Apparatus as claimed in claim 1, in which said second torque-limiting rotary connection sustains substantially the same torque limit upon rotation of the first element of the lead-screw device in either sense, and the first torque-limiting rotary connection sustains a higher torque limit than the said same torque limit upon rotation of the first element of the lead-screw device in said one sense and sustains a lower torque limit than said same torque limit upon rotation of the first element of the lead-screw device in said opposite sense.

3. Apparatus as claimed in claim 1, in which the said second torque limiting rotary connection sustains a lower torque limit upon rotation of the first part of the lead-screw device in the said appropriate sense and sustains a higher torque limit upon rotation of the second part of the lead-screw device in said opposite sense.

4. Apparatus as claimed in claim 3, in which the said second torque limiting device comprises two interengaging sets of teeth having sloping faces, and means for urging the two sets of teeth resiliently towards each other, those faces which are urged into contact with each other upon rotation of the first element of the lead-screw device in the said appropriate sense being less steeply sloping than those teeth which are urged into contact with each other upon rotation of the first element of the lead-screw device in the said opposite sense.

5. Apparatus as claimed in claim 3, in which the said first torque limiting rotary connection comprises a first surface carried by the first element of the lead-screw device, a second surface carried by the second element of the lead-screw device, and means for urging the first and second surfaces into frictional contact with each other.

6. Apparatus as claimed in claim 5, in which the urging means comprises a resilient spring and one of the first and second surfaces is provided by a surface of the spring.

7. Apparatus as claimed in claim 5, in which the first and second surfaces are urged into frictional contact with each other as aforesaid by axial movement of the first element of the lead-screw device relative to the second member in the said second direction, and the means for urging the first and second surfaces into frictional engagement with each other comprises the first and second elements of the lead-screw device and the second torque limiting connection.

* * * * *